3,244,483
PROCESS FOR PREPARING DIFLUORODIAZINE
Emil A. Lawton, Woodland Hills, and David F. Sheehan, Canoga Park, Calif., assignors to North American Aviation, Inc.
No Drawing. Filed Dec. 20, 1961, Ser. No. 161,343
3 Claims. (Cl. 23—205)

This application is directed to an invention in the preparation of compounds containing nitrogen and fluorine. More particularly, the invention is concerned with a method for the preparation of difluorodiazine.

Difluorodiazine ($N_2F_2$) finds use as a catalyst, as described by C. B. Colburn et al., J. Am. Chem. Soc., 81, 6397 (1959). It catalyzes the polymerization of methylmethacrylate, styrene, and cyclopentadiene at room temperatures. The polymerization of still other polymeric substances is catalyzed by difluorodiazine at higher temperatures.

Difluorodiazine has been prepared in the past by several methods. In one of these methods, fluorine is reacted with hydrazoic acid to give fluorine azide which is then decomposed to give difluorodiazine. Hydrazoic acid is a highly explosive and toxic compound and fluorine azide is a highly explosive compound. Actual explosions are encountered in production of the latter. The other method consists of obtaining difluorodiazine as a gaseous by-product from the electrolysis of a melt of ammonium bifluoride. The chief product from the electrolysis is nitrogen trifluoride. The difluorodiazine has been reported to be present in amounts as high as 24 weight percent, however, it generally is found to be present in amounts ranging from about 5 to about 10 weight percent. A disadvantage of the electrolysis process is the difficulty of separation of the difluorodiazine from the nitrogen trifluoride. Difluorodiazine has also been prepared from $HNF_2$, but this process has the disadvantage of utilizing an explosive starting material. It is thus seen that need exists for an improved process for the preparation of difluorodiazine.

It is, therefore, an object of this invention to provide a process for the preparation of difluorodiazine. It is also an object of this invention to provide a process of which difluorodiazine will be the chief product. Another object is to provide a relatively less hazardous process for the preparation of difluorodiazine than that which has been available in the prior art. A further object of this invention is to provide a process for producing difluorodiazine in high yields. Still other objects of this invention will be apparent from the disclosure which follows.

The above and other objects of this invention are accomplished by a process for the preparation of difluorodiazine which comprises decomposing fluorinated urea liquid or N,N-difluorourea under basic conditions. The basic conditions may be provided in a variety of ways. When the reaction is conducted in aqueous solution, a sufficient quantity of hydroxyl ions may be reacted with N,N-difluorourea or fluorinated urea liquid at pH ranging from about 7 to 14. Preferably, however, when the reaction is conducted in aqueous solution, the pH range is controlled between 8 and 11. Furthermore, under aqueous conditions, it is desirable to add an alkali metal fluoride to the reaction mixture to complex any hydrogen fluoride. The basic conditions required in the process of this invention may be achieved under non-aqueous conditions by reacting the N,N-difluorourea or fluorinated urea liquid with an organic or inorganic base. An excess of base should be reacted in order to complex hydrogen fluoride produced in the reaction.

The process of this invention has several outstanding advantages. Unlike difluoramine, fluorinated urea liquid is sensitive to shock only under extreme conditions. N,N-difluorourea is, likewise, much less shock sensitive than difluoramine. Difluoramine, on the other hand, is extremely shock-sensitive and explodes with violence. Thus the process of this invention has the advantage of producing high yields of $N_2F_2$ without resort to explosive starting materials.

An embodiment of the present invention is the preparation of difluorodiazine by reacting N,N-difluorourea or fluorinated urea liquid with a strong inorganic base or with an alkali metal fluoride. The strong inorganic bases applicable to this embodiment of the invention include the alkali metal hydroxides, the alkaline earth hydroxides. The process may be carried out in the absence of a solvent, in an aqueous system or in the presence of a non-aqueous solvent or diluent.

Because unusually high yields of pure material are obtained, a particularly preferred embodiment of the invention comprises the reaction between fluorinated urea liquid liquid or N,N-difluorourea and an alkali metal fluoride. An alkali metal hydroxide may be employed in conjunction with the alkali metal fluoride in this embodiment of the invention, however, it is preferred to conduct the process in a non-aqueous system.

The alkali metal of the alkali metal fluoride that is employed is any of the alkali metals of Group 1–A of the Periodic Table of Elements, as found in the "Handbook of Chemistry and Physics," 41st edition, published by the Chemical Rubber Publishing Co., Cleveland, Ohio. Sodium fluoride, potassium fluoride, rubidium fluoride, and cesium fluoride are used in the process with increased reactivity as the atomic weight of the alkali metal is increased in the order $LiF < NaF < KF < RbF < CaF$. The difference in the reactivity of the alkali metal fluoride toward difluoramine may be due to the stability of an intermediate complex, namely, $MF \cdot HNF_2$.

When aqueous conditions are employed, it is preferred to use an alkali metal hydroxide, and results are also improved if the reaction mixture is buffered to a pH between 8 and 11.

A still further embodiment of the invention is to react the fluorinated urea liquid or N,N-difluorourea with ammonia. In this embodiment of the invention, the ammonia may be employed in the gaseous form and passed through or over the fluorinated urea starting material. Care must be exercised to avoid too high an ammonia concentration in the reaction vessel, as the reaction may be highly exothermic and violent.

Still another embodiment of the invention comprises the reaction between a fluorinated urea product and an organic amine under basic conditions. In this embodiment of the invention basic conditions may be supplied by the organic amine itself or by the addition of a base, either organic or inorganic.

Since the desired product, difluorodiazine, is a gas under ordinary conditions, it is preferred to conduct the reaction in an evacuated vessel which is connected to a series of cold traps in which the products of the reaction may be condensed and recovered. When conducting the reaction in the aqueous phase, the freezing point of the aqueous solution represents the lower limit of temperature applicable to the present process. When solid or gas phase reactants are employed, the reaction may be conducted from about −30° C. to about 60° C. A preferred temperature range for practicing the process of this invention is from about 0 to about 30° C. and in most instances the reaction is successfully conducted at ordinary ambient temperatures.

As negligible amounts of difluorodiazine are produced under acid conditions, it is important that the reaction mixture remain basic during the entire reaction period. Thus, the entire quantity of base to be employed may be mixed with the fluorinated product to be reacted at the beginning of the reaction. Alternately, however, enough base should be added to the fluorinated urea product to neutralize any acid which may be present in the fluorinated urea product and react with any hydrogen fluoride produced during the decomposition. The remainder of the basic reactant may then be added over the remainder of the reaction period.

Although the reaction is substantially complete upon the addition of all the basic ingredients to the fluorinated urea starting material, it is preferred to allow the reaction to continue for a short period of time under vacuum for best results. Thus, reaction times of from 15 minutes to 10 or more hours may be employed depending upon the temperature of the reaction, the degree of vacuum employed, and the rate of addition of the reactants. Under ordinary circumstances reaction times of from about 15 minutes to about 2 hours are satisfactory.

Although the process of this invention may be conducted in the absence of a solvent, particularly when unpurified fluorinated urea is employed as the starting material, it is often desirable, to employ liquid solvent for the difluorourea or fluorinated urea liquid. Among the solvents which may be employed are partially halogenated hydrocarbons, cyclic ethers and alkyl ethers. When a partially halogenated hydrocarbon is employed, it preferably has from 1 to 5 carbon atoms and is preferably halogenated alkane which is a liquid in some portion of the temperature range employed in recovering difluorodiazine. These partially halogenated alkane compounds includes methylchloride, methylbromide, dichloromethane, dibromoethane, difluoromethane, chloroform, ethylbromide, ethylchloride, ethyliodide, 1,1-dichloroethane, 1,1-fluoroethane, 2-bromopropane, 2-chloropropane, 1-chloro-2-methylbutane, tert-amylfluoride, 1-fluorobutane, 1-chlorobutane, 2-chlorobutane, 2-chloro-2-methylpropane, and the like. Dichloromethane is a preferred solvent since N,N-difluorourea is extremely soluble in this solvent.

The cyclic ethers applicable to the process of this invention are cyclic compounds having 5 or 6 ring atoms including one or more oxygen atoms, the remainder being carbon atoms, thus, tetrahydrofuran, tetrahydropyran, m-dioxane, p-dioxane, and the like may be employed in the process of this invention. A preferred solvent of the cyclic ether type is tetrahydrofuran, as it has been found that N,N-difluorourea is also very soluble in this compound.

The alkyl ethers applicable to the process of this invention are lower alkyl ethers which, in general, have up to about 8 carbon atoms in the molecule. They have the formula R—O—R', wherein R and R' are alkyl hydrocarbon groups having from 1 to 7 carbon atoms. The preferred ethers are those having from 4 to 6 carbon atoms and diethyl ether is the most particularly preferred solvent in this class. Other examples of alkyl ethers applicable to this invention are dimethyl ether, ethyl-methyl ether, di-n-propyl ether, and dibutyl ether.

The difluorourea and fluorinated urea liquid employed as starting materials in the process of this invention may be prepared by reacting urea with fluorine gas at temperatures ranging generally from −30° C. to above room temperature. The process for preparing fluorinated urea liquid is more fully described in a patent application, Serial No. 840,066, filed September 15, 1959, for Emil A. Lawton et al., and entitled, "Method of Preparing Difluoramine and Preparing Tetrafluorohydrazine Therefrom." Difluorourea may be recovered from the fluorinated urea liquid by fractionation or solvent extraction as disclosed respectively in application, Serial No. 103,-512, filed April 17, 1961, by Emil A. Lawton et al., and entitled, "Fluorine Containing Compounds," and application, Serial No. 103,255, filed April 17, 1961, by Michael G. Warner et al., and entitled, "Chemical Process."

As used throughout the specification, the term "active fluorine" means the amount of available fluorine in a given quantity of compound or mixture which will oxidize an acid solution of potassium iodide. In the examples which follow, percent of active fluorine is calculated from the amount of fluorine employed in preparing fluorinated urea liquid.

The process of this invention is more fully illustrated by the following examples in which all the parts and percentages are by weights:

*Example 1*

To a glass reaction vessel equipped with heating and cooling means, means for charging and discharging liquid, solid and gaseous reactants, and means for agitating the contents of the vessel, is added 10 grams of a fluorinated urea liquid containing 22 percent active fluorine, prepared by reacting 90 grams of urea with 8 grams of fluorine at 0° C. over a 4 hour period. To the reaction vessel is connected a vacuum line containing cold traps at −142° and −156° C. The system is evacuated and the reaction vessel is charged with 50 parts of sodium hydroxide pellets. The contents of the vessel are then agitated for 1 hour without heating or cooling and the gases given off by the reaction are trapped in the cold traps at the −142° and −156° C. The gaseous reaction products are primarily carbon dioxide and difluorodiazine. In addition, the reaction is conducted in glass apparatus and silicon tetrafluoride is produced. Solid carbon dioxide is condensed in the trapped cooled to −142° C. while silicon tetrafluoride and difluorodiazine condense in the trap cooled to −156° C. In order to recover difluorodiazine free of silicon tetrafluoride, the trap cooled to −156° C. is separated from the system at the end of the reaction period and an excess of potassium fluoride is added to the contents of the trap. The trap is then connected to a vacuum system containing a trap cooled to −156° C., and the portion containing the silicon tetrafluoride, potassium fluoride, difluorodiazine mixture is allowed to warm to room temperature. Silicon tetrafluoride is not volatile under these conditions complexed with the potassium fluoride and difluorodiazine is recovered exceptionally pure in the trap cooled on the −156° C.

*Example 2*

The procedure of Example 1 is followed except that the reaction is conducted under aqueous conditions in the presence of 30 parts of potassium hydroxide and 20 parts cesium fluoride. The same recovery procedure as followed in Example 1 is employed and a good yield of difluorodiazine results.

*Example 3*

To the reaction vessel and the vacuum system described in Example 1 is charged 30 parts of sodium hydroxide and 25 parts of solid rubidium fluoride in the minimum amount of water necessary to dissolve the reactants. The vessel is also charged with 100 parts of N,N-difluorourea. The system is sealed, evacuated, and the contents agitated for 4 hours. Gaseous reaction products are collected and purified as in Example 1, and a good yield of difluorodiazine results.

*Example 4*

Following the general procedure of Example 1, 340 parts of a fluorinated urea liquid prepared from 900 parts of urea and 494 parts of fluorine by reacting the urea were 0.25 mole of fluorine per hour, is charged to the reaction vessel which was subsequently cooled to −156° C. The solidified fluorinated urea liquid was covered with an excess of rubidium fluoride powder and the reaction vessel was evacuated. The mixture was permitted to warm to room temperature under the vacuum and condensable gaseous products were trapped at −196° C. A good yield of difluorodiazine, hydrocyanic acid and some difluoromine were produced in the reaction.

We claim:

1. A process which comprises reacting N,N-difluorourea with an alkali metal hydroxide in the presence of water, whereby difluorodiazine is formed, and recovering the thus formed difluorodiazine.

2. A process for the preparation of difluorodiazine which comprises reacting an alkaline metal fluoride with a fluorinated urea liquid, prepared from urea and fluorine, whereby difluorodiazine is formed, and recovering the thus formed difluorodiazine.

3. A process for the preparation of difluorodiazine which comprises reacting N,N-difluorourea with an alkali metal fluoride and an alkali metal hydroxide, whereby difluorodiazine is formed, and recovering the thus formed difluorodiazine.

No references cited.

MAURICE A. BRANDISI, *Primary Examiner.*

LEON D. ROSDOL, CARL D. QUARFORTH, REUBEN EPSTEIN, *Examiners.*